Nov. 10, 1953 J. F. BYRNE 2,658,992

SINGLE SIDE BAND JAMMING SYSTEM

Filed Dec. 10, 1945

*INVENTOR.*
JOHN F. BYRNE

*BY* William D. Hall

*ATTORNEY*

Patented Nov. 10, 1953 2,658,992

UNITED STATES PATENT OFFICE 2,658,992

SINGLE SIDE BAND JAMMING SYSTEM

John F. Byrne, Wellesley Hills, Mass., assignor to the United States of America as represented by the Secretary of War Application December 10, 1945, Serial No. 634,089

1 Claim. (Cl. 250—17)

This invention relates to electrical circuits in general and more particularly to electrical circuits for the single sideband transmission of radio frequency jamming signals.

In the field of military radio countermeasures the need frequently arises for means of transmitting at the highest power level possible spurious signals intended to jam enemy equipment. In some situations it is desirable that such spurious signals, occupying a predetermined frequency band width, consist of a very great number of components closely grouped and all being signal components. In situations requiring such apparatus, limitations often exist as to the size and power permissible for the transmitting apparatus, and, therefore, efficiency is of the essence.

In the prior art, solutions generally have been in the nature of devising means for making transmitting apparatus more and more compact and capable of handling larger and larger volumes of input power so that output power, accordingly, could also be high.

It is well known in the art that single sideband transmission is an efficient form of signal transmission because all of the radiated power is carried in signal components, and the large amount of power frequently lost in useless carrier transmission is conserved. However, in the prior art single sideband transmission has been restricted in use because of circuit design difficulties and because of the need to reinject the carrier at the receiving station in order to preserve the significance of the original intelligence which was transmitted.

It is an object of this invention to devise a practical means for single sideband transmission of jamming signals.

Figure 1:
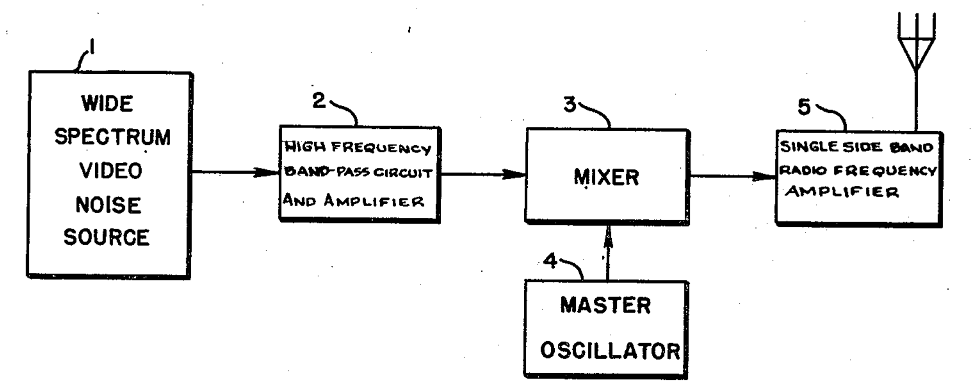
Figure 2:
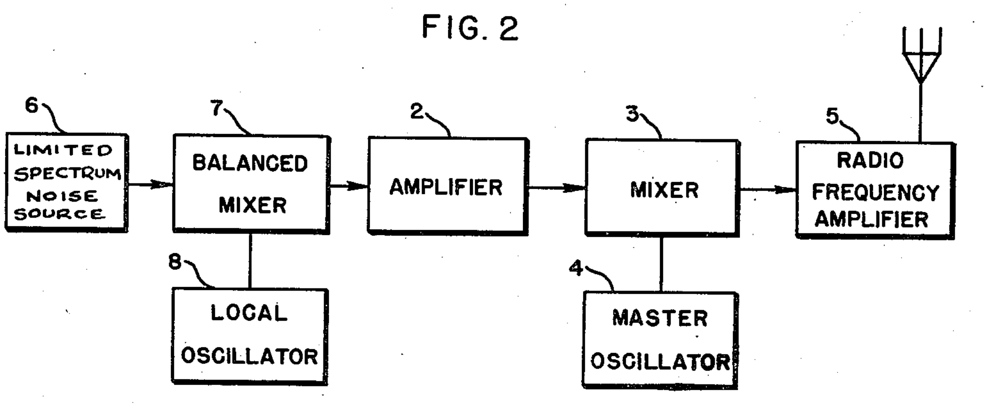

Other objects and advantages of this invention will be apparent during the course of the following description taken in connection with the accompanying drawing in which Fig. 1 is a block diagram of one embodiment of the invention and Fig. 2 is a block diagram of another embodiment of the invention.

Referring now more particularly to Fig. 1, block 1 represents a wide spectrum video noise source. This noise source produces the random signal components desirable for jamming purposes. It is essential that this noise source cover a spectrum extending far up into the high frequency region for reasons which will be disclosed hereinafter. The output of noise source 1 is connected to block 2 which represents essentially a high frequency band-pass circuit and amplifier. In this amplifier signal components covering only a high frequency portion of the wide spectrum signal put out by said noise source 1 is selected and amplified. The output of amplifier 2 is connected to mixer 3. Also connected to an input of said mixer 3 is the output of master R. F. oscillator 4. It is obvious that the output of mixer 3 will consist of, in part, two sidebands and a carrier lying between them on the frequency spectrum. There may be other frequencies such as harmonics of the carrier, that is of the single frequency put out by master oscillator 4, but these other frequencies are so far removed from the carrier along the frequency spectrum that they may be disregarded for the purposes of this discussion. The output of mixer 3 is connected to block 5 which represents any suitable conventional radio frequency power amplifier having selective circuits at the input or output or both so that one sideband only is selected and amplified therein. As was described above, amplifier 2 selects noise components in a relatively high frequency region. Because of this each final sideband, after the noise signal and the carrier have been mixed, is so far from the carrier that selection is easy. The output of power amplifier 5 consists of radio frequency signals of sufficient power to be radiated from an antenna which may be of conventional design and the output does not contain either the carrier frequency or the sideband not selected by the circuits of power amplifier 5 for amplification.

Referring now to Fig. 2 which is an alternate embodiment of this invention, block 6 may be a noise source which is not capable of producing signal components extending so far into the high frequency region of the spectrum as the noise source designated as block 1 in Fig. 1. Except for the fact that this noise source is not required to produce components in the upper frequency region of the spectrum, it must meet the other requirements of proper jamming signals. The output of noise source 6 is connected to an input of a balanced mixer 7. There is a local oscillator 8 whose output is also connected to an input of balanced mixer 7. The frequency of the signal coming from local oscillator 8 should be such that when mixed with the output of noise source 6, the result will be beat frequencies sufficiently high in the frequency spectrum so that the sidebands resulting from a later mixing with a carrier will be far enough removed from said carrier to permit ready selection of a single sideband for final power amplification. Since mixer 7 is balanced, the signal from local oscillator 8 is suppressed and beat frequencies both above and below it can be used for later modulation of the R. F. carrier. Accordingly, high frequency band-pass circuit and amplifier 2 should have a pass band having the same center frequency as the signal from local oscillator 8 and sufficiently wide to accommodate the beat frequencies above and below this signal which occur in the output of balanced mixer 7. If the frequency components of the noise source cover a band width which extends to very low frequencies, then there will not be a large gap in signal components occurring at the output of balanced mixer 7. The output of balanced mixer 7 is connected to high frequency band-pass circuit and amplifier 2 which has the same general nature and function as was described respecting amplifier 2 in Fig. 1. Moreover, the entire portion of this embodiment beyond balanced mixer 7, as shown in Fig. 2, is the same as the corresponding portion of the embodiment already described and shown in Fig. 1. The function of this entire portion of this embodiment is likewise the same.

It will be seen that the circuits herein described will permit ready isolation along the frequency spectrum of one sideband so that it may be amplified alone at final output radio frequency and the transmitted power will not include either the carrier or the other sideband.

It will be apparent that there may be deviations from the invention as described which still fall fairly within the spirit and scope of the invention.

Accordingly I claim all such deviations which fall fairly within the spirit and scope of the invention.

What is claimed is:

A jamming transmitter, comprising means for generating a radio frequency voltage; means for generating random noise having a spectrum, the upper end of which has a comparatively low frequency; means for deriving two sidebands from the output of said noise generating means including an oscillator having a given frequency output and a balanced mixer, said given frequency being suppressed thereby; a high frequency band pass amplifier for the output of said sideband deriving means comprising a pass band having a center frequency substantially coincident with said given frequency; means for effecting a modulation of the output of said radio frequency voltage generating means with the high frequency band passed by said amplifier; and a transmitter for the modulated radio frequency voltage including means for selecting a given sideband.

JOHN F. BYRNE

References Cited in the file of this patent

UNITED STATES PATENTS

| Number | Name | Date |
|---|---|---|
| 1,820,898 | Barone | Aug. 25, 1931 |
| 1,994,048 | Purington | Mar. 12, 1935 |
| 2,167,722 | Lindenblad | Aug. 1, 1939 |
| 2,207,620 | Hilferty | July 9, 1940 |
| 2,246,184 | Peterson | June 17, 1941 |
| 2,272,068 | Pollack | Feb. 3, 1942 |
| 2,416,307 | Grieg | Feb. 25, 1947 |
| 2,418,119 | Hansen | Apr. 1, 1947 |

FOREIGN PATENTS

| Number | Country | Date |
|---|---|---|
| 369,934 | Great Britain | Mar. 23, 1932 |

OTHER REFERENCES

War Dept. Technical Manual, TM11-845, November 14, 1944, for Transmitting Set AN/TPT-1, 250-17 JAM.